Jan. 28, 1930.        O. A. PRICE        1,744,798
PIVOTED DISK VALVE
Filed Jan. 29, 1929        2 Sheets-Sheet 2

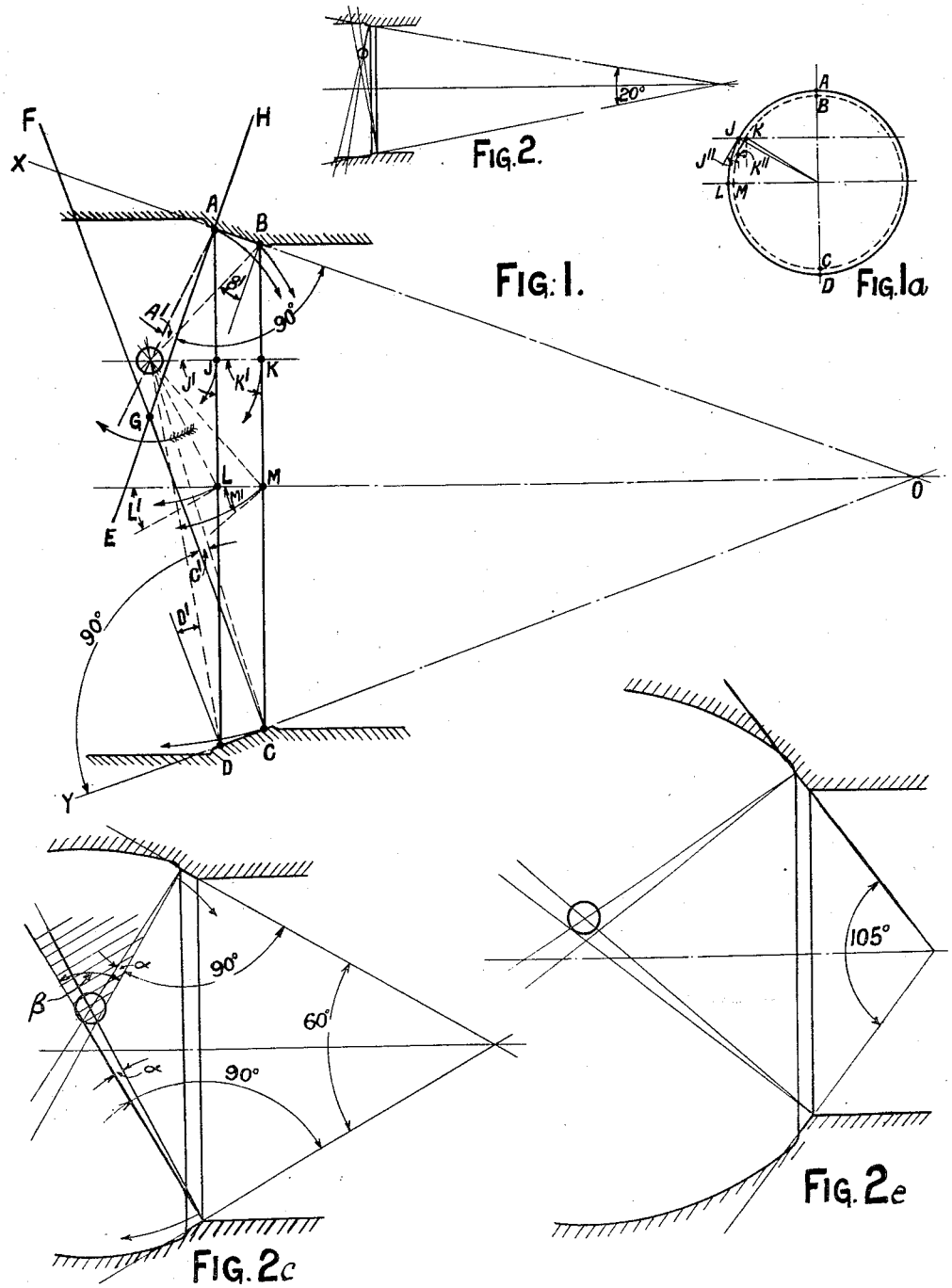

INVENTOR.
O. A. PRICE
BY
ATTYS.

Patented Jan. 28, 1930

1,744,798

UNITED STATES PATENT OFFICE

OWEN ALFRED PRICE, OF KILMARNOCK, SCOTLAND

PIVOTED DISK VALVE

Application filed January 29, 1929, Serial No. 335,768, and in Great Britain March 8, 1928.

This invention relates to pivoted disk valves, and has for its primary object to provide a pivoted disk valve which is watertight and which has therefore an extended range of useful applications, besides better serving purposes for which pivoted disk valves have heretofore been used.

A valve according to the invention may be contrived as a foot valve, reflux, check, or non-return valve, outfall, flap, pipe-intake or draw-off valve, performing duties which have not formerly been commonly performed by pivoted disk valves, or may be applied as customarily as a shut-down valve, automatically or positively controlled, or as a so-called rotary valve in which the obturating disk and the pivot are so far displaced as to permit juxtaposition of a pipe section rotatable into coincidence with the main pipe line when the valve is opened. Yet again the valve of the present invention may be used in all cases where flap valves or clacks have formerly been used and also as a pump valve.

A valve according to the invention comprises a beveled edge disk tiltable about a pivotal axis parallel to, though displaced from a true diameter, and so located, with respect to the angle of the seat bevel and the width of the seat, that the disk drops (by a tilting movement) truly into, and lifts by a reversed movement accurately out of, a fixed seating of corresponding bevel and without any rubbing action or possibility of seizing.

The invention is illustrated in the accompanying drawings in which Figs. 1 and 1ª are diagrammatic views at right angles to one another selected for the purpose of illustrating the principle of the invention.

Figures 2, 2ᶜ, and 2ᵉ are diagrammatic views illustrating the relation of the inclination of the seat bevel to the position of the pivot.

Figure 3 is a vertical sectional view of a self-acting foot valve embodying my invention.

Figure 3ª is a top plan view of Figure 3 with part broken away.

Figures 4 and 4ᶜ are segmental sectional views showing the use of a packing.

Figure 8A:
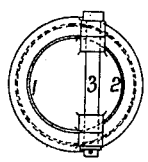
Figure 8:
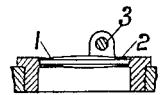

Figure 8ª is a top plan view of my invention as applied to a pump valve.

Figure 8 is a vertical sectional view taken through Figure 8ª.

A, B, C, D represents the disk member in closed position engaging its seat. XOY is the angle of the seat bevel. The line AE is drawn from the outer edge of the disk at right angles to the seat bevel and the line CF is drawn from the inner edge of the disk also at right angles to the seat bevel, intersecting AE at T. If then the pivot is confined within the angle FGH, the disk will tilt freely into, or out of, the seat bevel. The faces at every point on the circumference of the disk approach their contact points on the seat bevel at definite angles of approach and no sliding takes place on the seat. Thus, for the position of the pivot chosen in Fig. 1 the angles of approach of the seat faces, in a plane at right angles to the pivot axis, at the points A, B, C, D, J, K, L, M are respectively A', B', C', D', J', K', L', M', varying from a minimum at A and C to a maximum of 90° at J and K. It will be observed that movement of the points J and K, transverse to the plane of the seat, is possible because the pivot is offset from a diameter and the direction of travel of the points J and K is inclined from the seat wall at the angles J'' and K'', respectively, which therefore constitute angles of approach in the plane of the seat.

The diagrams show clearly that the correct position of the pivot is influenced by the width of the seat, the angle of the seat bevel and the minimum angle of approach, (or, regarded from another aspect, the minimum "clearance") desirable at the extreme points A and C. Thus, if the width of the disk edge is greater or less the line CF is displaced bodily in the corresponding direction.

The relation of the inclination of the seat bevel to the position of the pivot will be appreciated from consideration of the series of diagrams in Figs. 2, 2ᶜ, 2ᵉ. In Fig. 2ᶜ α denotes the angle of approach of the seating faces, the pivot being located within the angle β.

It has been assumed that the seat face and the beveled edge of the disk form parts of the surface of a true cone with apex for instance at O in Fig. 1. For practical purposes, however, the condition should be considered as satisfied if the respective surfaces conform substantially to those of the frustum of a cone. In practice, one or both of the surfaces may be slightly curved, in order, for instance to overcome manufacturing difficulty in producing perfect contact at the seats or for any other purposes.

In any application of the improved pivoted disk valve the width of the seat faces will be determined by practical considerations of the necessary joint width, and the angle of the seat bevel will then be chosen to suit a desirable position of the pivot. For instance it may be advisable to arrange the pivoted disk, when in open position, so that it divides the stream into two practically equal portions, in which case the necessary thickness or shape of the disk for withstanding the working pressure will affect the preferred distance of the pivot from the plane of the seat.

Several constructions embodying the invention are illustrated by way of example in the drawings.

Figure 3:
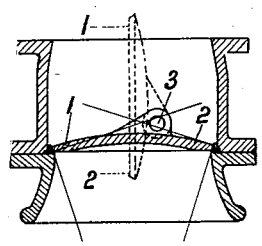
Figure 3A:
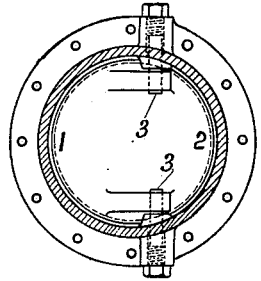

Thus Figs. 3 and 3ᵃ show an improved form of self-acting foot valve, reflux valve, check valve or non-return valve. The angle of the seat bevel may be, for instance, about 30° to 40° and the minimum angle of approach of the seat faces about 3° to 5°. The valve is exceedingly easy to open and requires only a very small force to maintain it wide open since the greater part of its weight is then borne on the pivots. Being eccentrically pivoted, the valve disk comprises a long flap 1 and a short flap 2. Closing is, therefore, effected by the unbalanced forces due to both weight and stream action operating on the long flap 1, while the short flap 2 is forced against the advancing stream and cushions the closure, thereby preventing violent slam. As the valve tilts on its seat, the entire water load is transferred to the seat faces and the load eased off the pivots 3, ordinary working clearance at the pivots being sufficient to secure this result and ensure close watertight contact of the seat.

Figure 4:
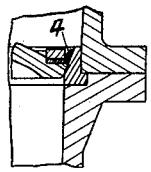

In cases where dirty water has to be passed, metal seats are liable to suffer and the valve will not close tightly. To meet these conditions, a packing of some kind, or a staunch somewhat as shown at 4 in Figs. 4 and 4ᶜ may be fitted, the arrangement being preferably such that the load is taken on the metal seat while the staunch completes the watertightness.

Figure 5:
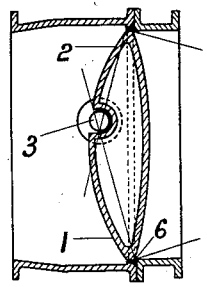
Figure 5 is a vertical sectional view of a butterfly type of valve embodying my invention.

In Fig. 5 is shown a large size shut-down butterfly type of valve suitable for either automatic or direct control. The pivot 3 being entirely clear of the joint ring 6 and the edge of the valve disk being truly circular, the machining operations are simplified and no difficulties are met with in making a watertight joint near the pivot base. The joint ring or seat may be readily renewed and easily adjusted axially, during manufacture, so as to make true contact with the valve disk. Slightly greater operating power is required than with a centrally pivoted valve disk but this circumstance is outweighed by the increased watertightness and other advantages of the valve.

Figure 6:
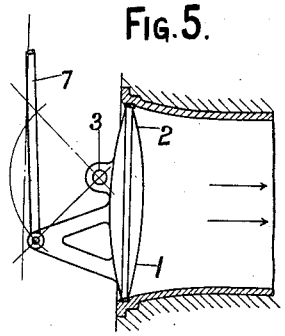
Figure 6 is a side view partly in section of my invention as applied to a draw-off valve.
Figure 4C:
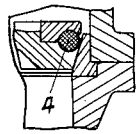

Fig. 6 may be taken to represent an application of the valve to an outfall flap or pipe intake or as a draw-off valve. In this connexion the present valve offers considerable advantages over the sliding sluices commonly used for such purposes. Less operating power is required; as the operating member 7 is always in tension it may be a tie-rod or chain; also there is no wear on the seat or liability to jamming. A further advantage is that the valve conforms particularly well with the desirable form of bellmouth pipe-end for such work and results in an inexpensive and efficient combination.

Figure 7:
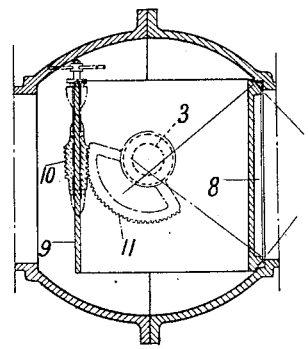
Figure 7 is a vertical sectional view of a rotary valve incorporating my invention.

With the adoption of a wide angle seat bevel the principle of the invention may be readily incorporated in a rotary valve of the type in which the obturating member 8 when swung open, gives place to a pipe section 9 of clear full-way bore as shown in Fig. 7. Such valves when open offer the minimum resistance to stream flow.

A simple form of the improved valve mounted on its own seat and suitable for a pump valve, or any other purpose, is shown in Figs. 8 and 8ᵃ.

What I claim is:—

1. The combination with a beveled valve seat of a circular valve disk having its edge beveled to correspond to said seat, said disk tiltable about a single fixed pivotal axis parallel to but displaced from a true diameter of said disk a distance less than the radius of said disk and so located with respect to the bevel angle and the width of the seat that the disk drops by a tilting movement truly into and lifts by a reversed movement accurately from said seat without any rubbing action.

2. The combination with a conical valve seat of a pivoted valve disk having an edge located on the surface of a cone conformable with said seat, the pivot of said disk being spaced from the large diameter face of said disk and offset from the axis of said disk and located within the angle contained between a line drawn transverse to the pivot and normal to the surface of said cone from a point on the disk boundary of larger diameter and a line drawn normal to said surface from a point diametrally opposite the first point and located on the disk boundary of smaller diameter, the vertex of said angle being nearer the axis of the cone than the pivot.

In testimony whereof I have signed my name to this specification.

OWEN ALFRED PRICE.